(12) United States Patent
Tambascio et al.

(10) Patent No.: US 7,551,072 B2
(45) Date of Patent: Jun. 23, 2009

(54) RUN-TIME CONFIGURATION OF ALARMS AND EVENTS

(75) Inventors: Kevin Tambascio, Lyndhurst, OH (US); Kenwood H. Hall, Hudson, OH (US); John J. Baier, Mentor, OH (US); David K. Johnson, Waukesha, WI (US); Dale Sapach, Roberts Creek (CA); Jan Bezdicek, Prelouc (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 308 days.

(21) Appl. No.: 11/537,340

(22) Filed: Sep. 29, 2006

(65) Prior Publication Data

US 2008/0079559 A1    Apr. 3, 2008

(51) Int. Cl.
*G08B 29/00* (2006.01)
*G08B 19/00* (2006.01)

(52) U.S. Cl. .................. 340/506; 340/511; 340/521

(58) Field of Classification Search .................. 340/506
See application file for complete search history.

(56) References Cited

U.S. PATENT DOCUMENTS

| 6,076,952 | A | 6/2000 | Gretla et al. |
| 6,229,430 | B1 | 5/2001 | Smith Deway |
| 6,542,075 | B2 * | 4/2003 | Barker et al. ................. 340/506 |
| 6,617,969 | B2 * | 9/2003 | Tu et al. ..................... 340/517 |
| 6,690,274 | B1 * | 2/2004 | Bristol ....................... 340/506 |
| 6,700,483 | B2 | 3/2004 | Chernoguzo et al. |
| 7,076,695 | B2 | 7/2006 | McGee et al. |
| 2002/0022894 | A1 * | 2/2002 | Eryurek et al. ................. 700/80 |
| 2002/0198686 | A1 | 12/2002 | Hu et al. |
| 2005/0065630 | A1 | 3/2005 | Funk et al. |
| 2006/0129336 | A1 | 6/2006 | Pretlove et al. |

* cited by examiner

*Primary Examiner*—Donnie L Crosland
(74) *Attorney, Agent, or Firm*—Turocy & Watson, LLP; William R. Walbrun (57) ABSTRACT

An alarm configuration system comprises a receiver component that receives parameters relating to an industrial process. An alarm generator component automatically configures an alarm during run-time based at least in part upon an analysis of the received parameters. Thus, the alarm generator component can alter alarm instructions during run-time within an industrial environment.

19 Claims, 12 Drawing Sheets

RUN-TIME CONFIGURATION OF ALARMS AND EVENTS

TECHNICAL FIELD

The claimed subject matter relates generally to alarms within an industrial setting, and, more particularly, relates to configuring alarms during run-time.

BACKGROUND

Due to advances in computing technology, businesses today are able to operate more efficiently when compared to substantially similar businesses only a few years ago. For example, high speed data networks enable employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, activities that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases (or web services referencing databases) that are accessible by system/process/project managers on a factory floor. For example, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

In typical control applications, alarms are generated when a process variable value lies outside a predefined expected range, when a sensed parameter lies outside an expected range, when particular user action is undertaken (such as depression of an emergency stop), and the like. These alarms provide an indication to an operator or device that an unexpected event has occurred with respect to a particular control process. In another example, alarms that are not associated with a high level of urgency can be created and logged, and may not be provided to an operator unless a more urgent, related alarm occurs. Thereafter, logs can be parsed in an effort to determine a source of failure with respect to a control process.

Conventionally, field devices produce or consume data and are monitored by a higher-level system, such as a Manufacturing Execution System (MES). These higher-level systems analyze data being produced and/or consumed on a factory floor and generate alarms if monitored data lies outside a predefined range. In large facilities, a significant number of alarms can be generated in a small amount of time, wherein order of generation depends upon an order that data is received at the high-level system (which can often depend upon communication medium, length of travel of data, etc.).

SUMMARY

The following presents a simplified summary of subject matter described in more detail herein in order to provide a basic understanding of some aspects of such subject matter. This summary is not an extensive overview, and is not intended to identify key/critical elements or to delineate the scope of the subject matter described herein. Its sole purpose is to present some concepts in a simplified form as a prelude to the more detailed description that is presented later.

Briefly described, the subject disclosure pertains to alarm generation and configuration. More particularly, alarms can be configured "on the fly" at run-time within an industrial environment, thereby providing flexibility with respect to alarms and events in association with industrial automation. To perform such configuration, parameters relating to an industrial process are received and analyzed. Such parameters can include but are not limited to process state, device state, alarm state, status of sensors and/or actuators, operator status, one or more events, and other suitable parameters. One or more of such parameters can trigger an alteration in alarm configuration, and such configuration can occur at run-time. Pursuant to an example, data tables relating to alarm configuration can be exposed, and such data tables can be accessed and contents therein can be modified. For instance, thresholds associated with tags in a controller can be changed. Additionally or alternatively, logic code can be created and implemented during run-time based upon an analysis of the process parameters. Thus, alarm instructions can be modified "on the fly."

In accordance with another aspect, alteration in configuration of alarms can coincide with alteration with respect to configuration of human-machine interfaces (HMIs). For example, when alarm format is altered, an HMI should also be altered to properly reflect alterations to formatting. Additionally, the generated HMIs can enable a user to perform corrective action with respect to an alarm with, for instance, depression of a graphical push-button. In other words, alarms can be linked to components that generate HMIs, and such HMIs can be utilized to take corrective action with respect to the alarms.

Additionally, particular events logged by a controller can be subscribed to such that the controller pushes the particular events to a component that can generate and/or configure alarms. For example, a controller can log an event relating to when an operator changes and events such as changing of an operator can be subscribed to by a component that generates/configures alarms. When the controller logs such event, a notification of occurrence (and other suitable data) can be provided to the component that generates/configures alarms, which can thereafter modify alarm configuration "on the fly" (e.g., during run-time).

To the accomplishment of the foregoing and related ends, certain illustrative aspects are described herein in connection with the following description and the annexed drawings. These aspects are indicative, however, of but a few of the various ways in which the principles of the invention can be employed and such subject matter is intended to include all such aspects and their equivalents. Other advantages and novel features will become apparent from the following detailed description when considered in conjunction with the drawings.

DETAILED DESCRIPTION

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Furthermore, aspects of the disclosed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Figure 1:
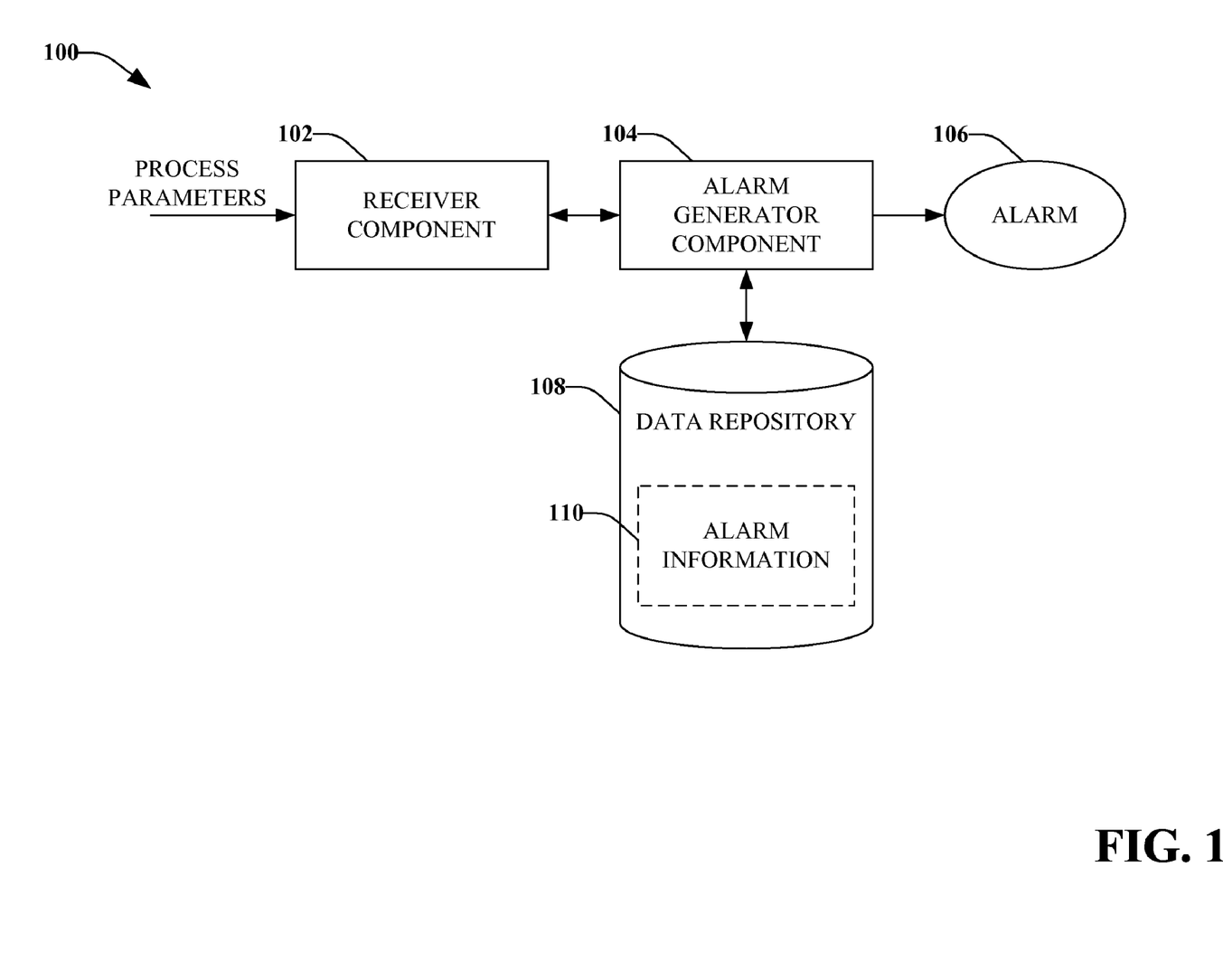
FIG. 1 illustrates an example system that facilitates configuration of alarms during run-time.

Now referring to the drawings, FIG. 1 illustrates a system 100 that facilitates configuring alarms at run-time. In other words, the system 100 can be utilized to enable modification of alarm configuration "on the fly." The system 100 includes a receiver component 102 that receives parameters relating to an industrial process at run-time. For example, such parameters can include data received from sensors on a factory floor, user input, state of a device, state of a process variable, state of an alarm or an event, data relating to an operator (such as operator preferences), contextual data, including time of day, day of week, time of year, and other suitable contextual data, and the like. Additionally, the process parameters can include higher-level data, such as data from an Enterprise Resource Planning (ERP) system, including order status, inventory, schedules, etc. Thus, substantially any suitable data relating to a manufacturing process can be received by the receiver component 102, wherein such data can be received during run-time of the manufacturing process.

The receiver component 102 can be communicatively coupled to an alarm generator component 104, which can automatically configure alarms (and/or package events) during run-time based at least in part upon the received process parameters. Additionally, the alarm generator component 104 can create an alarm 106 if, for instance, a process variable lies outside an expected range and/or upon receipt of particular user input (e.g., depressing of an emergency stop button). Still further, in connection with configuring the alarm 106 during run-time, the alarm generator component 104 can expose data tables relating to the alarm 106, access data therein, and modify such data to cause an alarm to be configured and/or altered during run-time. In more detail, the alarm generator component 104 can access a data repository 108 that includes alarm information 110 therein. The alarm information 110 may comprise data tables relating to alarms, which can include data relating to backing tags. Pursuant to a particular example, backing tags can be accessed and adjusted (e.g., limits associated therewith can be altered), backing tags can be written via an independent interface to adjust alarm behavior, and ladder code can be written to change alarm behavior dynamically.

Thus, rather than the system 100 being static with respect to alarms, the alarm generator component 104 can be utilized to dynamically configure an alarm during run-time of a manufacturing process. Conventionally, to alter alarm configuration, a manufacturing process is halted, data tables are manually accessed and updated and/or ladder logic is manually written by an operator. Thereafter the manufacturing process can be re-initiated and alarms are configured according to the altered logic/data tables. In contrast, the alarm generator component 104 can, depending upon particular process parameters, access the alarm information 110 within the data repository 108, make changes thereto, and thus alter configuration of the alarm 106.

This dynamic configuration of alarms at run-time allows control systems to be more flexible when compared to conventional systems. In an example, the receiver component 102 can receive process parameters that indicate that manufacture of a batch is near completion, and can pass such information on to the alarm generator component 104. The alarm generator component 104 can then access the alarm information 110 and change thresholds associated with one or more process variables. For instance, since the process is near completion, more leeway may be given with respect to particular process variables. In another example, to whom the alarm 106 will be delivered can alter. Thus, at one stage of a process the alarm 106 may desirably be provided to a first individual while during a second stage of the process the alarm 106 may desirably be provided to a second individual. The alarm generator component 104 can receive indications as to a state of a process and can write ladder logic code to configure the alarm 106 accordingly. Additionally, the alarm generator component 104 can write/support structured text, function block, and/or a sequential function diagram.

The system 100 can reside within any suitable location within an industrial setting. For example, an industrial controller, such as a logic controller or a robotic controller can comprise the system 100. Additionally, the system 100 can exist within a Manufacturing Execution System (MES). Still further, a network infrastructure device, such as a switch, a router, a proxy, a gateway, and/or the like can include the system 100.

Figure 2:
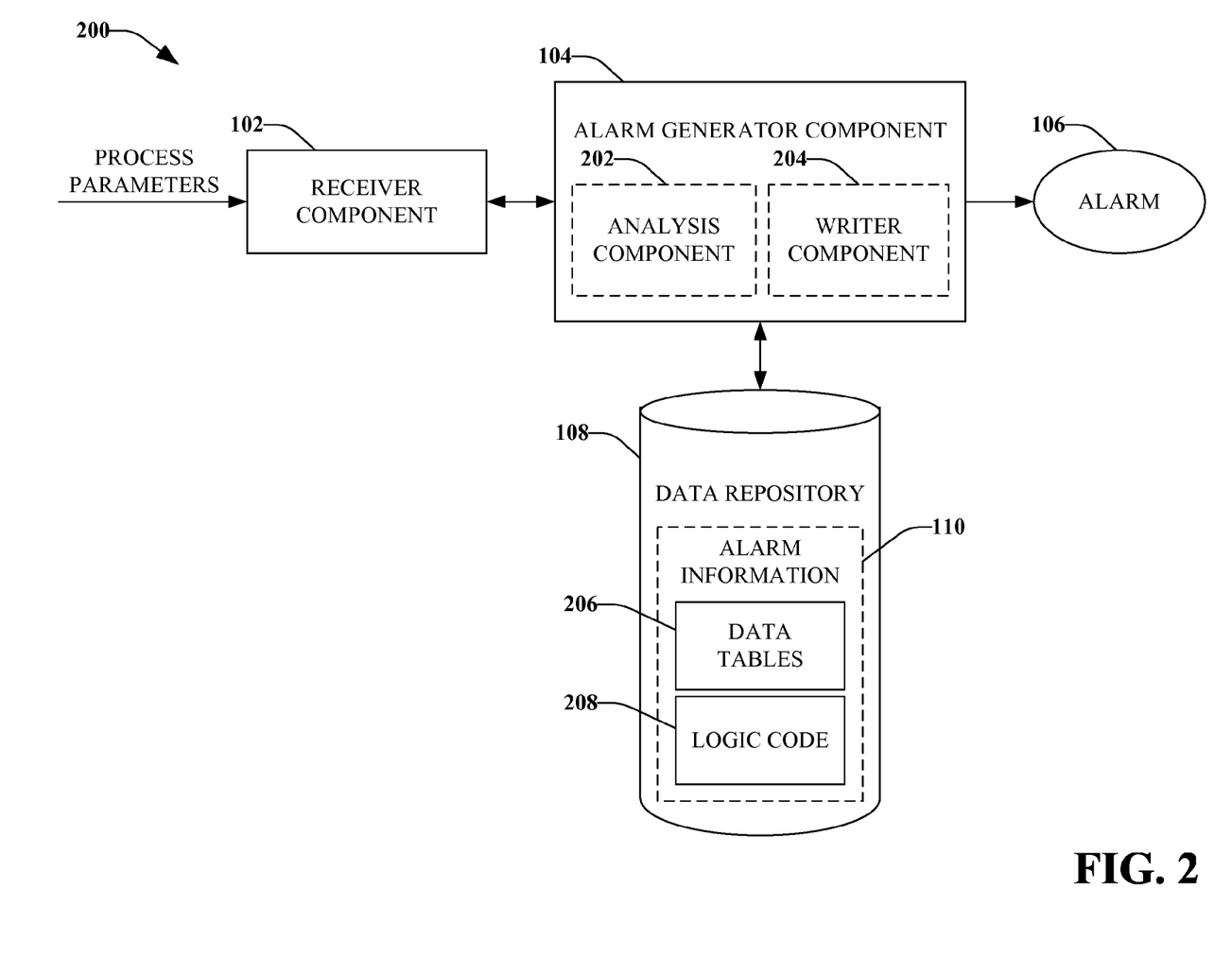
FIG. 2 illustrates an example alarm configuration/generation system.

Turning now to FIG. 2, a system 200 that facilitates configuration of alarms "on the fly" is illustrated. The system 200 includes the receiver component 102, which receives process parameters with respect to a particular manufacturing process. Such parameters can be provided to the alarm generator component 104, which includes an analysis component 202 that can analyze such parameters to determine if an alarm should be generated and/or if an alarm configuration should be altered. For instance, the analysis component 202 can determine from received parameters that an alarm should be generated as a temperature associated with a process is above a desired level. The analysis component 202 can also be utilized to change configuration of future alarms to be generated by the alarm generator component 104. For example, the alarm generator component 104 may be tasked with creating alarms with respect to a certain process. As states associated with the process change during run-time, however, it may also be desirable to alter configuration of an alarm generated by the alarm generator component 104, including altering acceptable ranges of process variables, altering or creating ladder logic, and the like.

The analysis component 202 is associated with a writer component 204, which is employed to configure alarms as they are generated and/or configure the system 200 with respect to future alarms. For instance, the analysis component 202 can determine that data tables 206 within the alarm information 110 should be accessed and modified. Additionally, the writer component 204 can create logic code 208 (such as ladder logic) based at least in part upon factory parameters received by the receiver component 102 and analysis thereof by the analysis component 202. For example, the logic code 208 can cause alarms to be generated under particular circumstances, can cause alarms to be provided to different individuals, can cause alarms to be displayed in a certain format, etc. Moreover, the writer component 204 can access and modify data within the exposed data tables 206 and/or create logic code during run-time.

Figure 3:
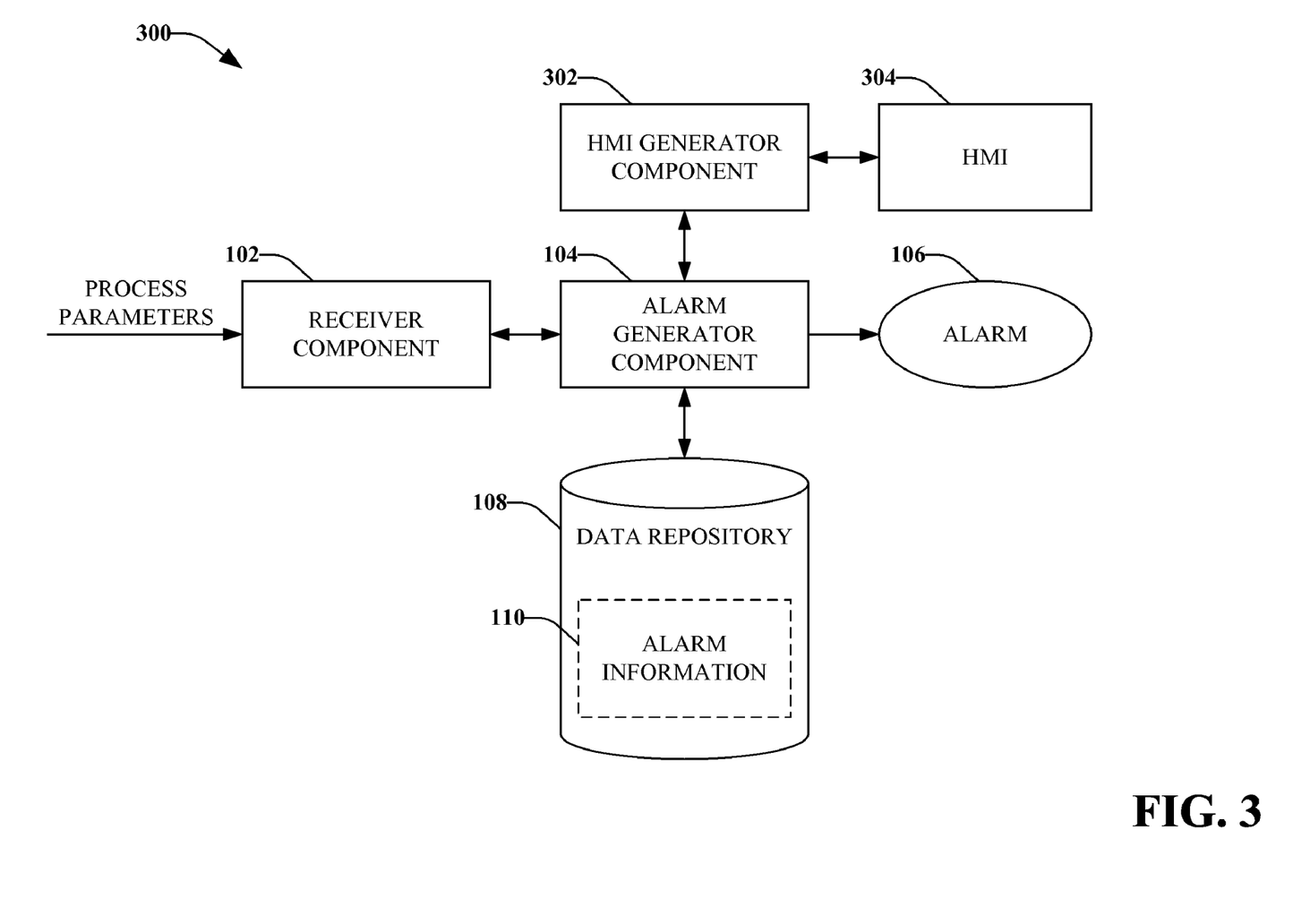
FIG. 3 illustrates an example system that facilitates generation of human-machine interfaces given an alteration in alarm configuration.

With reference now to FIG. 3, a system 300 that facilitates provision of alarms to an individual is illustrated. The system 300 includes the receiver component 102 that receives process parameters from sensors, data repositories, users, and/or the like. The receiver component 102 provides such data to the alarm generator component 104, which analyzes the data and configures the alarm 106 or future alarms based upon the analysis. As described above, data tables can be exposed, and the alarm generator component 104 can access the data tables, review backing tags, make alterations to limits associated therewith, and create and/or modify logic code. Thus, the alarm generator component 104 can access the data repository 108, which includes the alarm information 110 (e.g., exposed data tables) and can make modifications to such information 110 based at least in part upon the received process parameters. Moreover, the alarm generator component 104 can create/modify logic code, such as ladder logic, and can cause such logic to be implemented.

The alarm generator component 104 can be communicatively coupled with a human-machine interface (HMI) generator component that can dynamically create interfaces associated with the alarm 106. Conventionally, alarms generated in industrial environments are static in that an identical alarm is delivered each time a process variable lies outside an expected range, for instance. Moreover, conventionally alarms are not associated bi-directional communicating abilities—rather, an alarm is provided to a recipient for informational purposes and the recipient is unable to take corrective action through the alarm. In contrast, the HMI generator component 104 can automatically create interfaces that enable a recipient to undertake corrective action with respect to the alarm 106. In an example, the alarm 106 may be generated to inform a recipient that a welding temperature has become too high and that the welder has been shut-down. An HMI 304 created by the HMI generator component 302 can enable the recipient to take action with respect to the alarm 106. For instance, the HMI 304 can include push-buttons that allow the recipient to request a maintenance person in close proximity to the welder to correct the problem associated with the welder, a push-button to divert resources to other manufacturing lines, and a push-button to forward the alarm to other personnel.

The HMI generator component 302 can additionally take into consideration contextual data and user preference when creating the HMI 304. For example, the HMI generator component 302 can create the HMI 304 with certain color combinations given type of screen displaying the HMI 304, lighting associated with the screen, user preferences, availability of maintenance personnel, process status, alarm status, etc. Therefore, the HMI 304 can be customized according to user preference and/or context, and can provide a manner for a recipient of an alarm to dynamically undertake corrective action.

Figure 4:
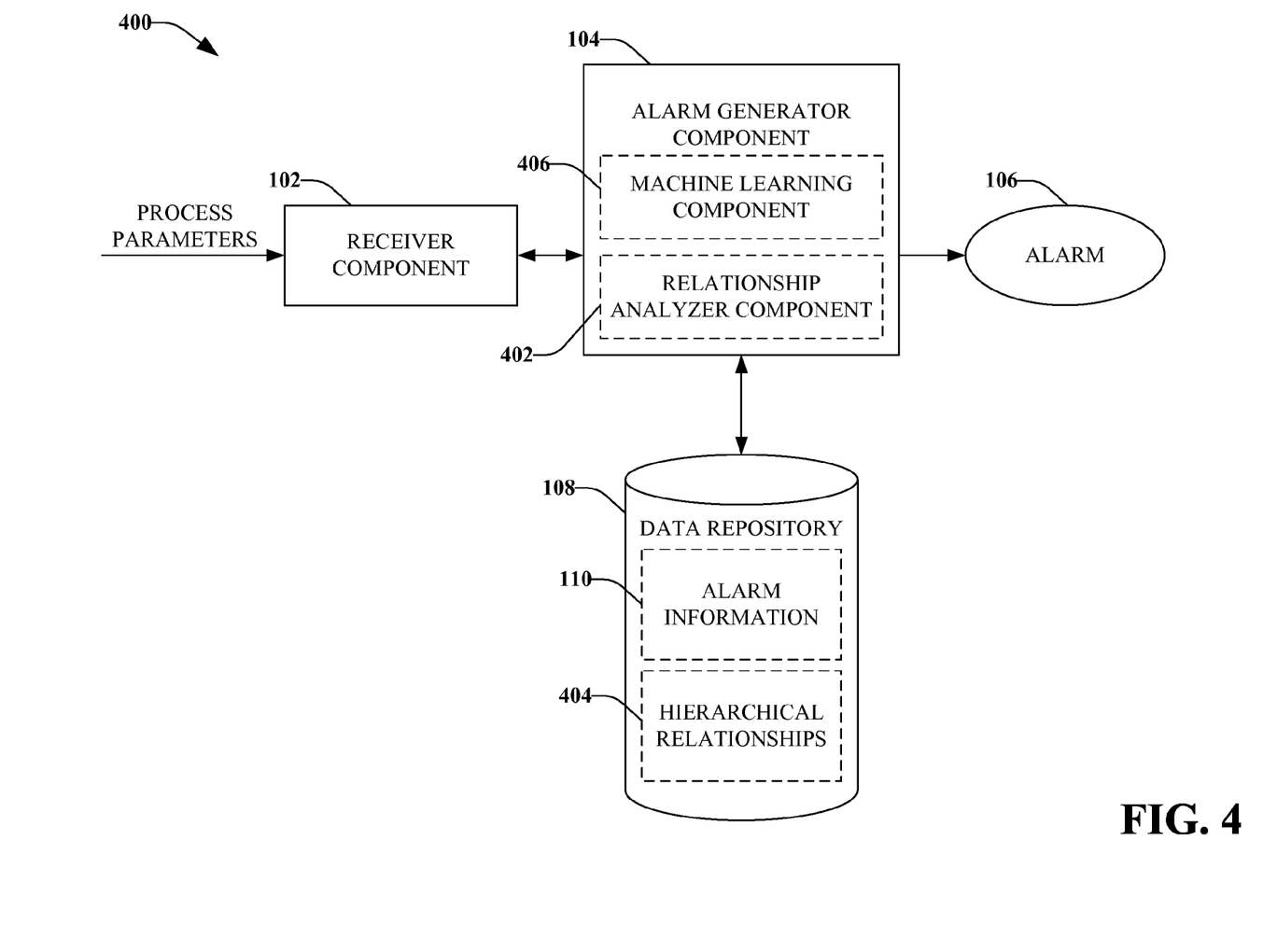
FIG. 4 illustrates an example system for altering alarm instructions during run-time based upon hierarchical relationships associated with an industrial process.

Now referring to FIG. 4, an alarm generation system 400 is illustrated. The system 400 includes the receiver component 102, which receives parameters associated with an industrial process. The receiver component 102 is communicatively coupled to the alarm generator component 104, which can generate alarms, configure alarms as they're being generated, or configure future alarms. As described above, the alarm generator component 104 can access exposed data tables, make modifications to content therein, and/or create logic code during run-time. Such data can be retained within the alarm information 110 within the data repository 108, and changes can be stored therein as well. It is understood that the data repository 110 need not be a single entity, but can be distributed across several pieces of hardware.

The alarm generator component 102 is associated with a relationship analyzer component 402, which can analyze hierarchical relationships amongst devices, processes, zones, factories, users, alarms, etc. Pursuant to an example, data produced and consumed by the system 400 can accord to a hierarchically structured data model, which is based at least in part upon ISA S88, ISA S95, and/or a combination thereof. Still further, hierarchical relationships 404 between users, processes, devices, and the like can be defined by a user (without association with a data model) and retained within the data repository 110. Moreover, the hierarchical relationships 404 can define parent-child relationships between alarms, such that if a parent alarm is provided to a particular device or operator a child alarm can be provided to a certain device or operator. Thus, when the alarm generator component 104 creates the alarm 106, relationships with respect to the alarm 106 can be analyzed and utilized in connection with delivering the alarm 106 and generating other alarms.

The alarm generator component 104 is also associated with a machine learning component 406, which can analyze received process parameters, defined relationships, and current contextual data in connection with generating and/or configuring the alarm 106 and/or future alarms. More particularly, the machine learning component 406 enables the alarm generator component 102 to infer how to generate/configure alarms during run-time based upon the aforementioned analysis. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

Pursuant to an example, process parameters can be received that indicate to the alarm generator component 104 that configuration of future alarms generated by the alarm generator component 104 should cause the alarms to be forwarded to a particular device and formatted according to parameters of such device. Additional process parameters can be received that cause the alarm generator component 104 to create an alarm (e.g., a user has depressed an emergency stop button). The relationship analyzer component 406 can analyze the device parameters and determine that the alarm is associated with a "parent" alarm according to a user-defined device hierarchy, and that such parent is to be provided to a different individual. The machine-learning component 406 can analyze current context of the party for which the "parent" alarm is intended and infer a most effective manner for notifying the individual. In an example, if the user is in a meeting, the machine-learning component 406 can infer that the "parent" alarm should be provided to such user by way of a text message to a mobile telephone.

Figure 5:
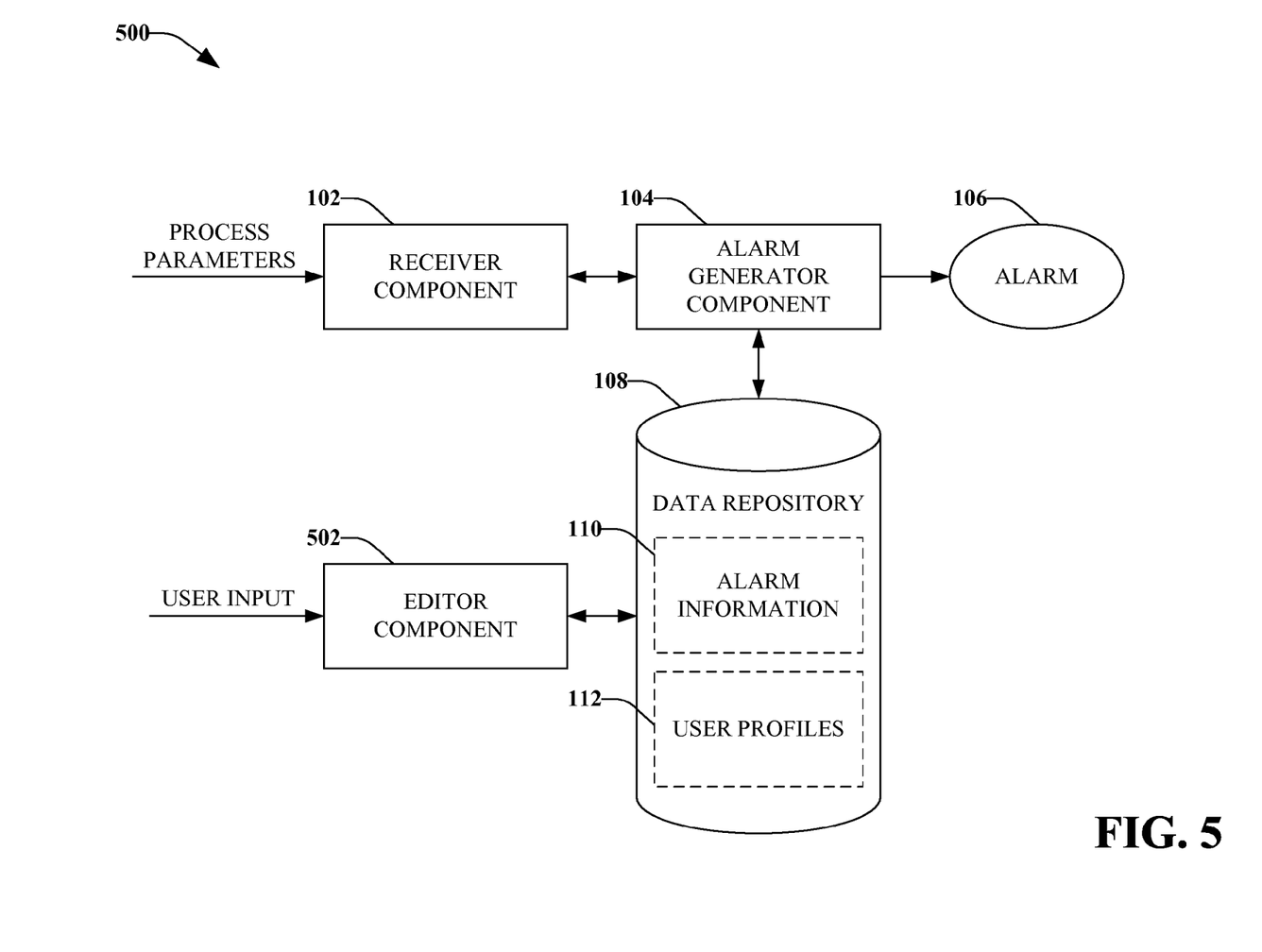
FIG. 5 illustrates an example system that facilitates enabling a user to provide input to an alarm configuration system.

Turning now to FIG. 5, an alarm generation/configuration system 500 is illustrated. The system 500 includes the receiver component 102 that receives parameters relating to a manufacturing process, including process state, state/status of devices associated with the process, sensor/actuator readings/statuses, and other suitable information. Such information can be provided to the alarm generator component 104, which can configure the alarm 106 and/or future alarms "on the fly" during run-time. Such configuration can include configuring alarms for format, content, and/or the like. Still further, configuration of the alarm 106 (and/or future alarms) can relate to changing parameters that cause an alarm to be generated. For instance, the alarm generator component 104 can access the alarm information 110 within the data repository 108 and alter parameters therein. In more detail, backing tag thresholds can be modified by the alarm generator component 104 during run-time and/or the alarm generator component 104 can write/edit logic code.

The system 500 can additionally include an editor component 502 that enables a user to provide input relating to user preferences. For example, a user can provide the editor component 502 with information relating to preferences regarding alarm formatting and/or alarm content given particular situations. Still further, the editor component 502 can receive information from the user regarding hierarchies of alarms. For instance, the user may wish to receive each alarm relating to a particular alarm, and can define relationships therebetween. Such information can be retained as user profiles 504 within the data repository 108. Thus, information regarding several users can be stored within the user profiles 504. When the alarm generator component 104 configures alarms during run-time, such configuration can be based at least in part upon current user and content of a user profile associated therewith. The user profiles 504 can also include a default profile for utilization with respect to first-time users.

Figure 6:
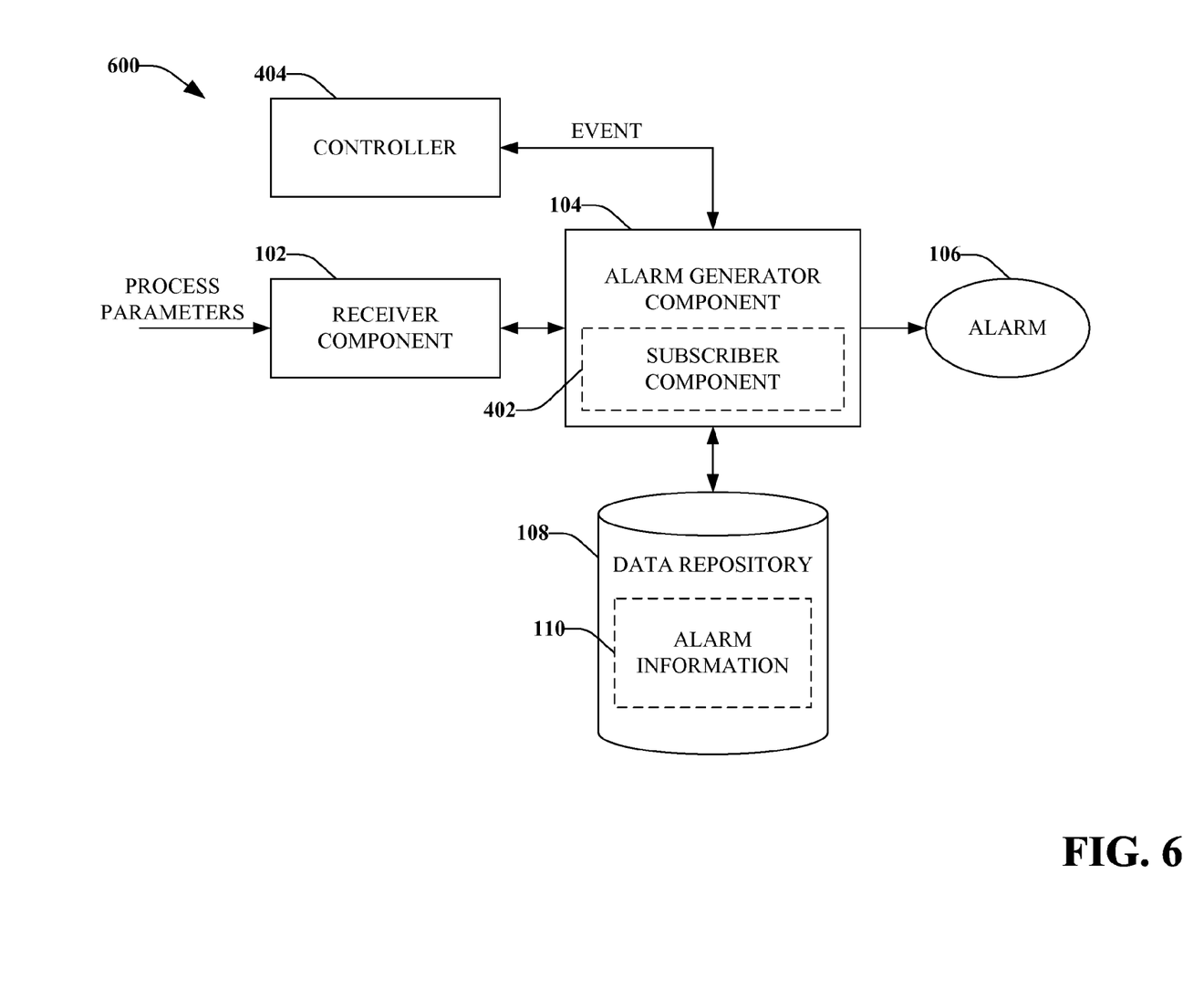
FIG. 6 illustrates an example alarm configuration system that can configure alarms during run-time based upon events logged by a controller.

With reference to FIG. 6, an alarm configuration/delivery system 600 is illustrated. The system 600 includes the receiver component 102 that receives parameters relating to an industrial process. The alarm generator component 104 is communicatively coupled to the alarm generator component 104, which can alter configuration of alarms during run-time. The alarm generator component 104 can include a subscriber component 602, which can subscribe to events that are associated with a controller 604. Pursuant to an example, a change in operator can result in the controller 604 logging such change as an event. The subscriber component 602 can enable the alarm generator component 104 to subscribe to such event, such that the event is delivered to the alarm generator component 104 upon each occurrence thereof. The alarm generator component 104 can thereafter configure future alarms based at least in part upon the received event.

In an example, the alarm generator component 104 can configure alarms in a customized manner for particular users. Thus, in this example, it is desirably for the subscriber component 402 to subscribe to events associated with the controller 404 that indicate that an operator has changed. When the controller 404 logs the event, such event can be pushed to the alarm generator component 104 by the controller, which can then configure future alarms according to the newly identified operator. Additionally or alternatively, the alarm generator component 104 can query the controller 404 for particular events.

While change in operator has been used as an example, it is understood that the subscriber component 402 can subscribe to any suitable event logged by the controller 404. Additionally, the subscriber component 402 can subscribe to events with respect to multiple controllers. Thus, the alarm generator component 104 can receive events from multiple controllers and can automatically and dynamically configure alarms at run-time based at least in part upon the received events. Still further, the alarm generator component 104 can configure alarms differently with respect to different devices/operators. For instance, the alarm generator component 104 can receive an event from the controller 404, which gives rise to an alarm that is desirably received by two different operators. The alarm generator component 104 can create two separate alarms that are configured for the two different operators, wherein the alarms arise from the same event.

Figure 7:
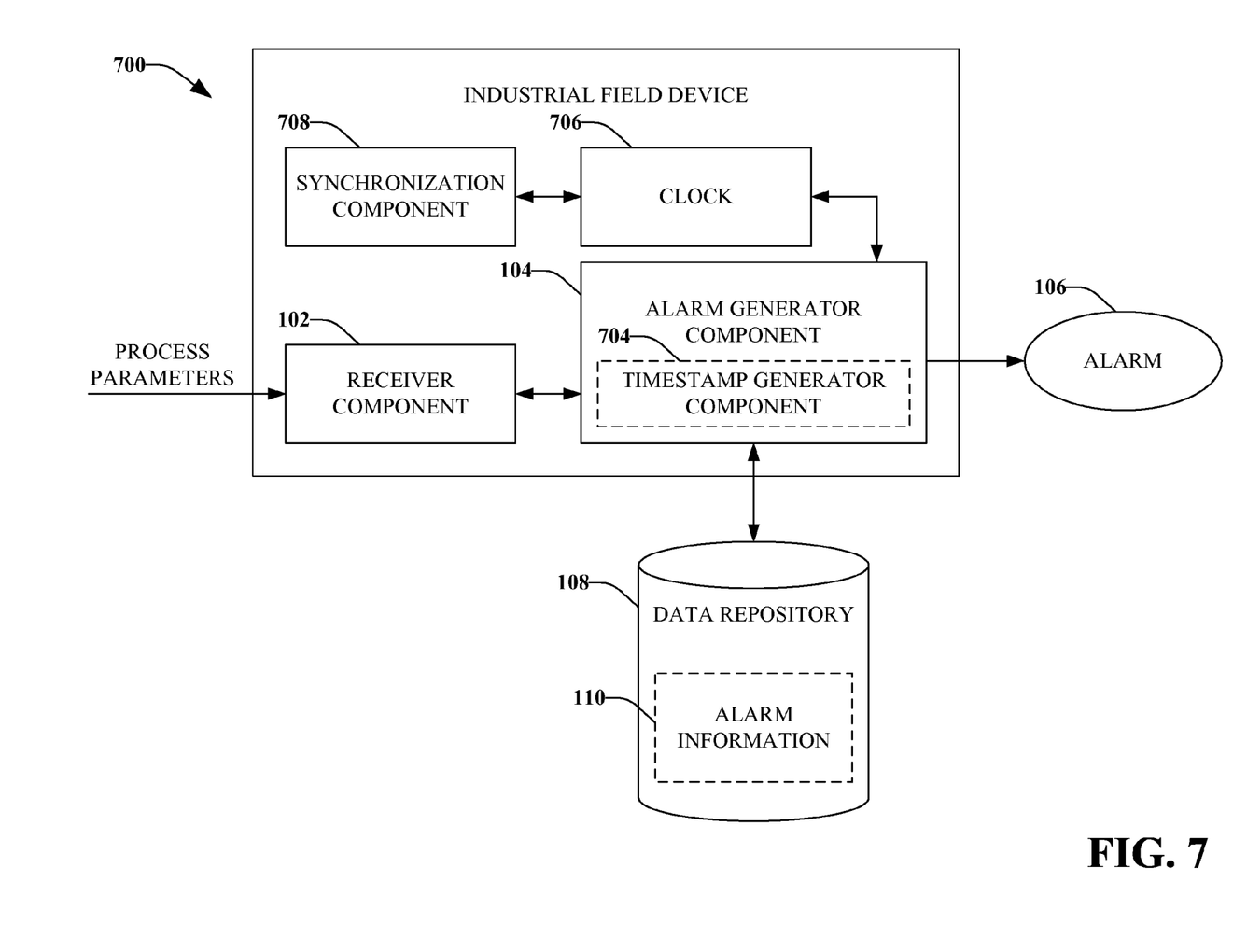
FIG. 7 illustrates an example alarm generation system that enables association of timestamps with an alarm.

Turning now to FIG. 7, a system 700 that facilitates configuration of alarms "on the fly" during run-time is illustrated. The system 700 includes an industrial field device 702, which can be, for instance, a controller, such as a logic controller or a robotic controller, a press, a pump, a network infrastructure device, including a proxy device, a router, a gateway, a switch, and/or the like, or any other suitable field device. The field device 702 includes the receiver component 102, which receives process parameters from a plurality of sources. The alarm generator component 104 can generate alarms and/or configure alarms during run-time based at least in part upon the received process parameters. As described above, the alarm generator component 104 can access the alarm information 110, make modifications to the alarm information 110, and/or generate logic code for execution within the industrial field device 702 (or another suitable device). More particularly, the alarm information 110 can include data tables that are exposed, wherein such tables can include threshold limits with respect to certain tags associated with the field device 702. The alarm generator component 104 can alter such thresholds, for instance, based at least in part upon received process parameters.

The alarm generator component 104 can be associated with a timestamp generator component 704, which can be utilized to associate alarms created/configured by the alarm generator component 104 with a timestamp. The field device 702 can include a clock 706 that is synchronized with at least one other clock of a different industrial field device. More particularly, a synchronization component 708 can synchronize the clock 706 with a clock of another industrial field device. Pursuant to an example, the synchronization component 708 can periodically receive an indication of time from a master clock (not shown) and can cause the clock 706 to be synchronized with such master clock. In an example, the clock 706 can be set according to an international time standard, such as Greenwich Mean Time. When the alarm generator component 104 creates an alarm, the timestamp generator component 704 can be utilized to associate a timestamp with such alarm, wherein the timestamp accords to a synchronized time. Alarms from different field devices can be retained in a data repository, and the alarms can be associated with timestamps that accord to a system-wide time. Thus, alarms from different devices/geographic locations can be placed in a chronologically correct order. Additionally, databases that include alarms can be merged and indexed efficiently.

Figure 8:
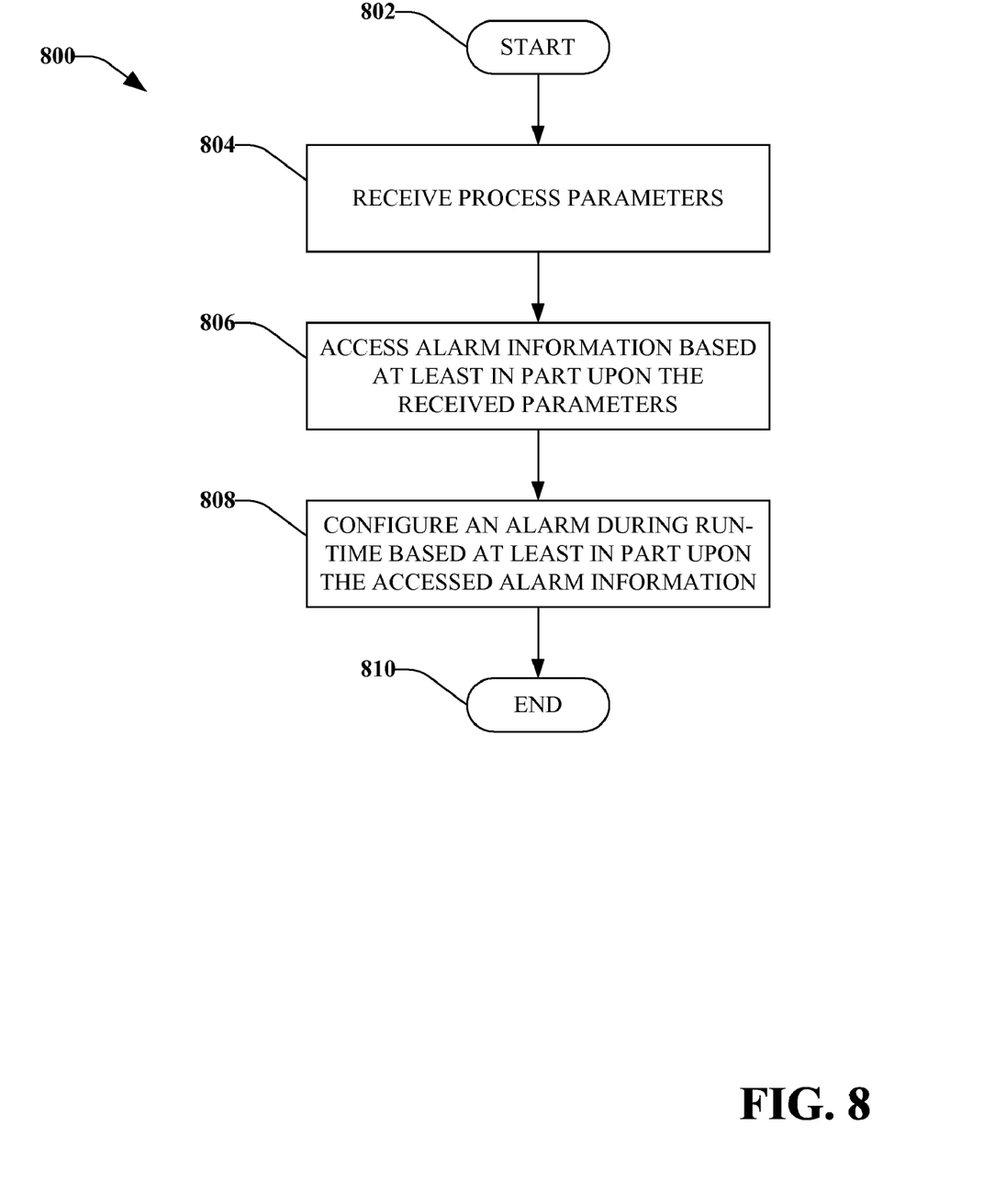
FIG. 8 is a representative flow diagram illustrating an example methodology for configuring an alarm during run-time.
Figure 9:
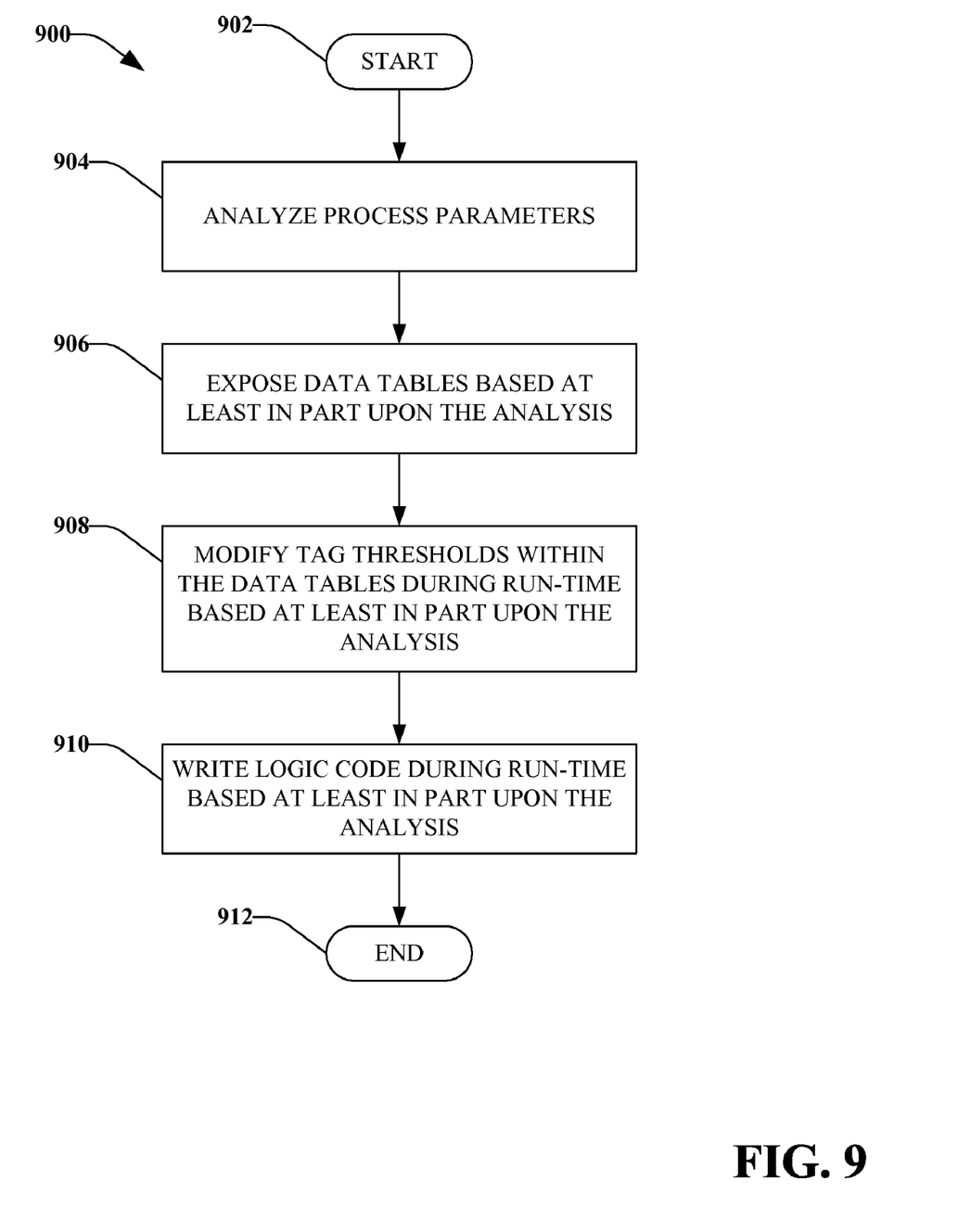
FIG. 9 is a representative flow diagram illustrating an example methodology for altering alarm instructions during run-time.
Figure 10:
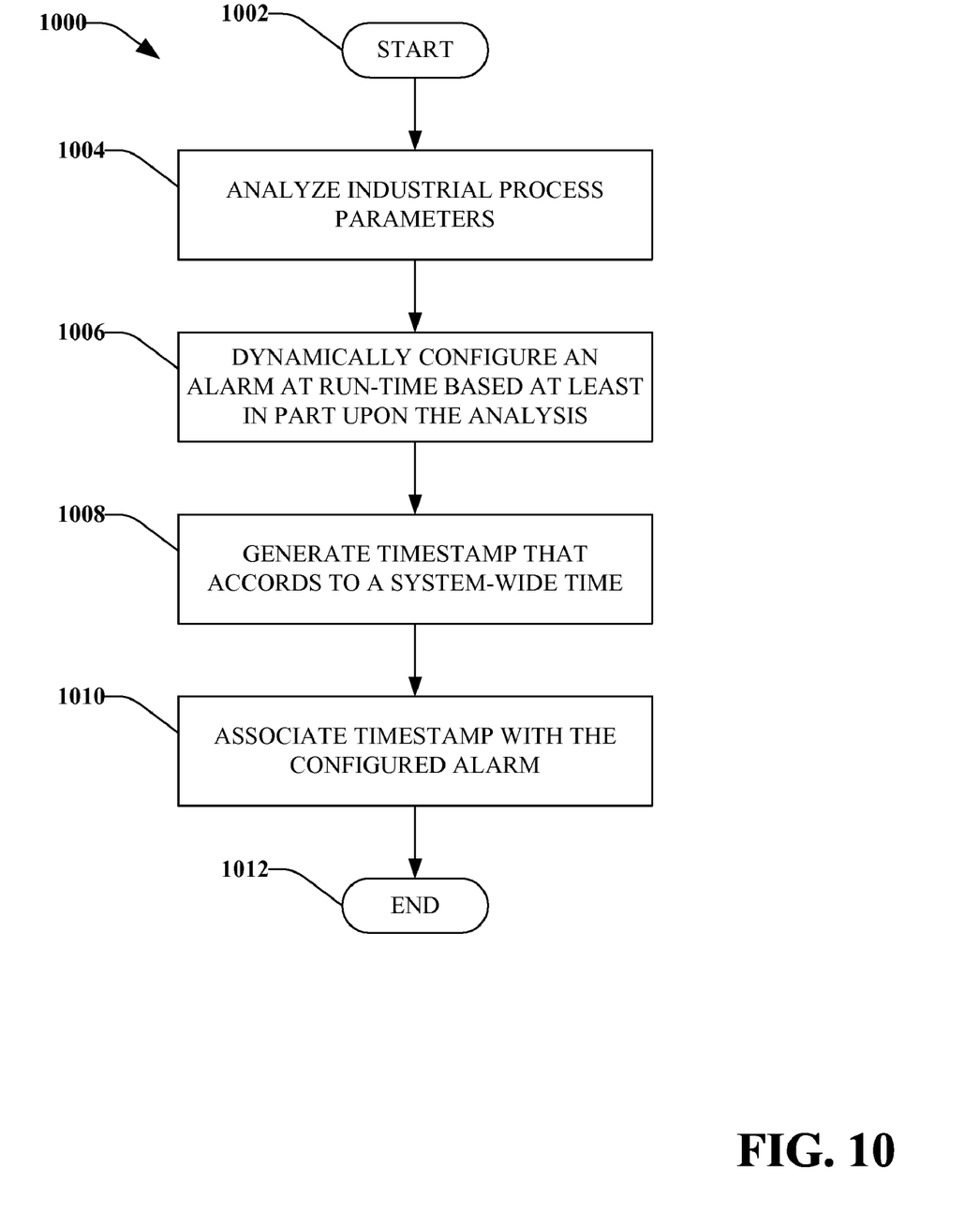
FIG. 10 is a representative flow diagram illustrating an example methodology for associating a timestamp with an alarm.

Turning to FIGS. 8-10, methodologies relating to configuring alarms are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring specifically to FIG. 8, a methodology 800 for configuring an alarm and/or future alarms at run-time in association with an industrial process is illustrated. The methodology 800 starts at 802, and at 804 process parameters are received. Such parameters can include sensed contextual data associated with a device or process, state of a device or process, alarm state or status, operator status, or any other suitable parameter that may be associated with an industrial process. At 806, alarm information is accessed based at least in part upon the received parameters. For example, if the received parameter is an indication that an operator associated with a process has changed (e.g., shift change), then alarm information relating to a new operator can be accessed. At 806, an alarm or future alarms is/are configuring during run-time based at least in part upon the accessed alarm information. For example, the accessed alarm information can be modified in connection with configuring an alarm or future alarm. Additionally, the accessed alarm information can be utilized to write logic code in connection with configuring the alarm or future alarm. The methodology 800 completes at 808.

With reference now to FIG. 9, a methodology 900 for configuring alarms during run-time is illustrated. The methodology 900 initiates at 902, and at 904 various process parameters are analyzed. As described above, the process parameters can relate to timing information associated with a manufacturing process, state of the process, devices within the process, sensed parameters, statuses of actuators, and/or the like. At 906, data tables are exposed based at least in part upon the analysis. Pursuant to an example, a combination of actuator states can cause certain data tables to be exposed, wherein the data tables can include, for instance, information relating to tags associated with a controller.

At 908, tag thresholds are modified within the exposed data tables during run-time based at least in part upon the analysis. For example, the process may be near completion, thereby enabling thresholds associated with a particular time to be modified (such that they are somewhat less stringent). When it is determined that a process exists at a certain state, data tables relating to threshold values can be exposed, and tag thresholds can be modified (e.g., to render thresholds more or less stringent). At 910, logic code can be optionally written during run-time based at least in part upon the analysis. Therefore, alarm instructions can be modified during run-time. The methodology 900 then completes at 912.

Turning now to FIG. 10, a methodology 1000 for configuring an alarm (e.g., altering alarm instructions) during run-time is illustrated. The methodology 1000 starts at 1002, and at 1004 industrial process parameters are analyzed, including but not limited to sensor and actuator states/statuses, process status, device configuration, and the like. At 1006, an alarm is dynamically configured (alarm instructions are altered) at run-time based at least in part upon the analysis. At 1008, a timestamp is generated that accords to a system-wide time. For instance, a field device can include a clock that is synchronized with at least one other clock associated with a second field device. A master clock can be utilized to synchronize the two clocks with one another. In another example, the clock within the aforementioned field device can act as the master clock. At 1010, the timestamp is associated with the configured alarm, and the methodology 1000 completes at 1012.

Figure 11:
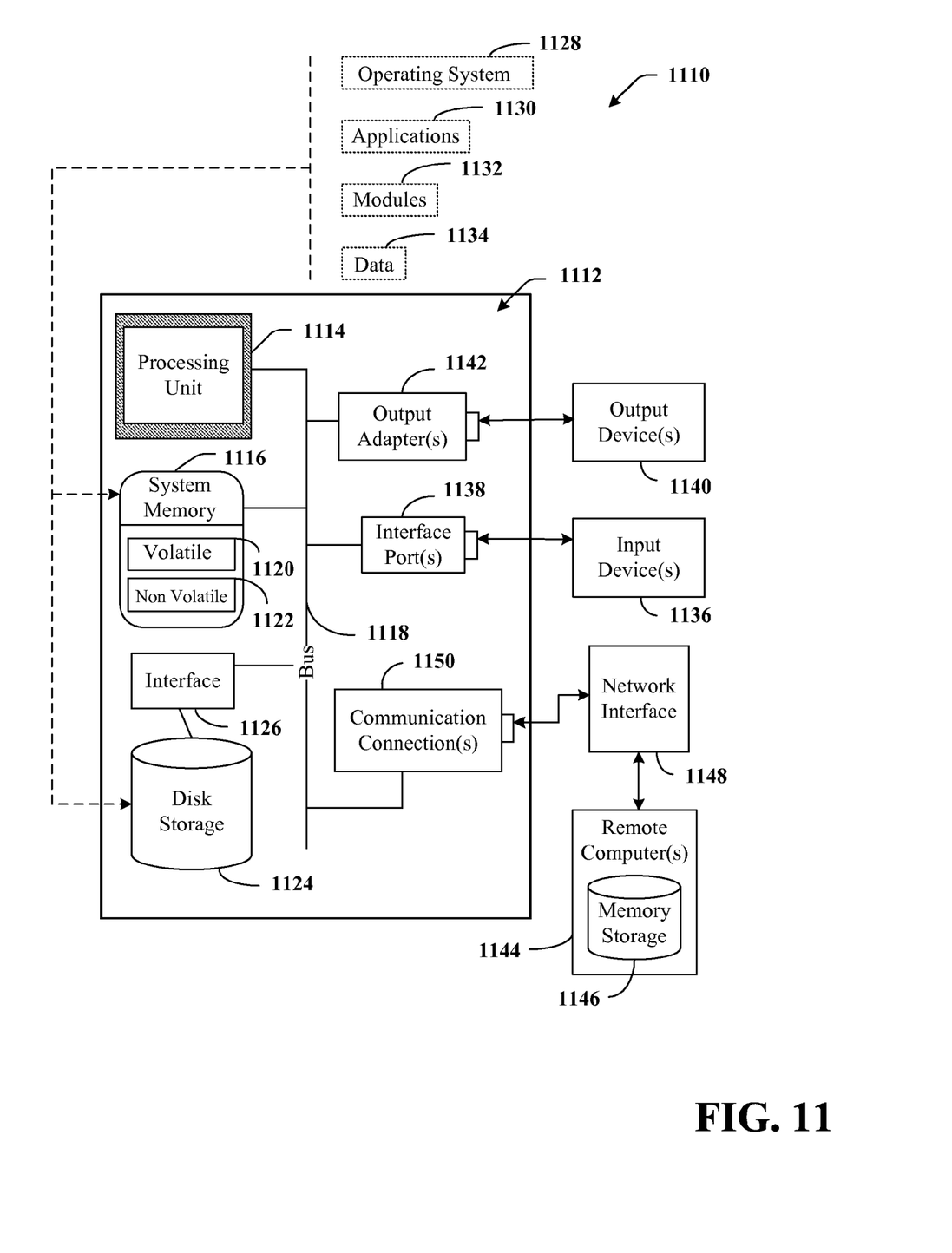
FIG. 11 is an example computing environment.

With reference to FIG. 11, an example environment 1110 for implementing various aspects of the aforementioned subject matter, including modifying alarm instructions during run-time, includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
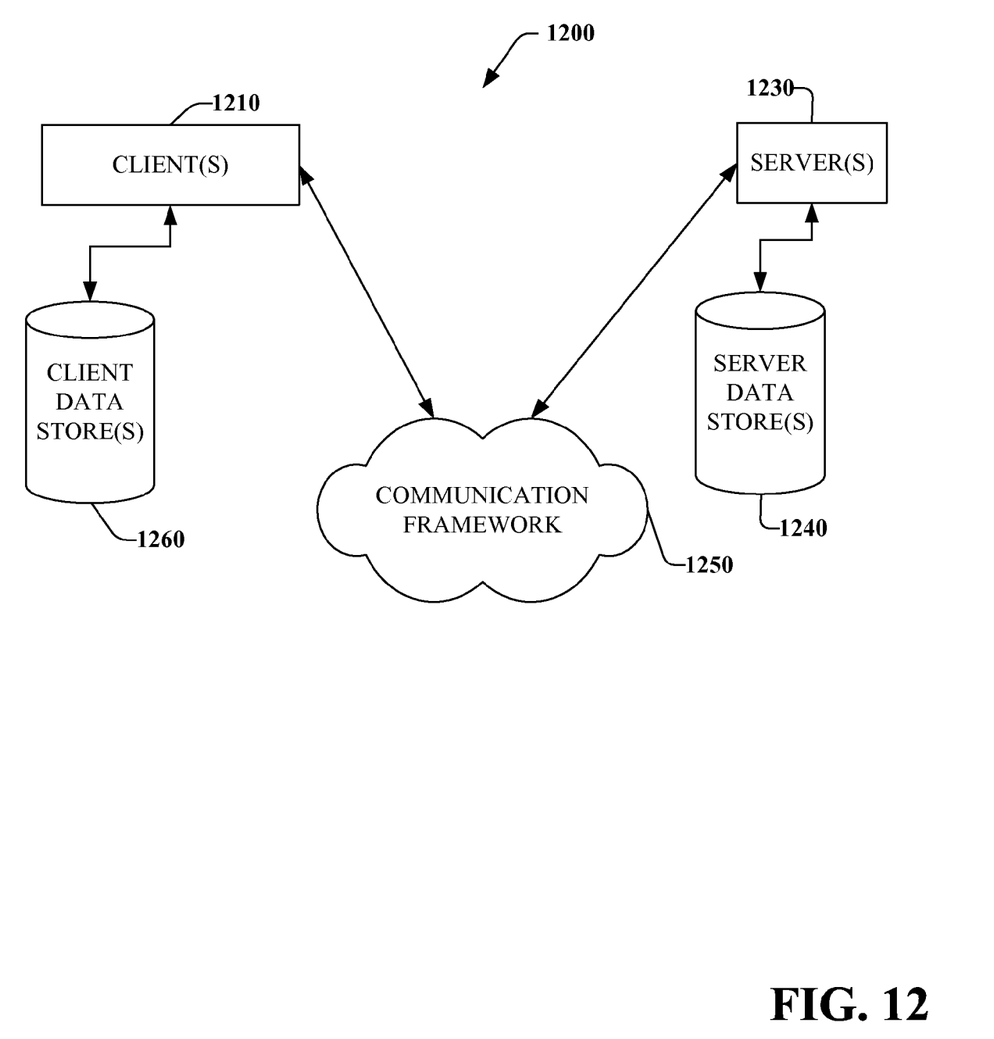
FIG. 12 is an example networking environment.

FIG. 12 is a schematic block diagram of a sample-computing environment 1200 with which the disclosed subject matter can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An alarm configuration system, comprising:
a receiver component that receives parameters relating to an industrial process; and
an alarm generator component that automatically configures an alarm during run-time by accessing alarm information, exposing data tables and modifying at least one of the alarm information or the data tables based at least in part upon an analysis of the received parameters.

2. The system of claim 1, the alarm generator component modifies thresholds associated with backing tags within the exposed data tables in connection with configuring the alarm.

3. The system of claim 1, farther comprising a writer component associated with the alarm generator component, the writer component generates logic code at run-time in connection with automatically configuring the alarm.

4. The system of claim 3, the logic code is at least one of ladder logic, a function block, structured text, or a sequential function diagram.

5. The system of claim 4, the logic code is implemented to alter alarm instructions during run-time.

6. The system of claim 1, further comprising an HMI generator component that creates a human-machine interface based at least in part upon the configured alarm.

7. The system of claim 6, the human-machine interface includes components that enable an operator to take corrective action with respect to the configured alarm.

8. The system of claim 1, further comprising a relationship analyzer component that analyzes hierarchical relationships associated with the industrial process, the alarm generator component configures the alarm based at least in part upon the analysis of the hierarchical relationships.

9. The system of claim 8, the hierarchical relationships include parent-child relationships amongst alarms.

10. The system of claim 1, further comprising an editor component that enables user profiles to be one or more of created and updated, the alarm generator component configures the alarm based at least in part upon content of a user profile.

11. The system of claim 1, further comprising a subscriber component that subscribes to one or more events associated with an industrial controller, the alarm generator component configures the alarm based at least in part upon the one or more events.

12. The system of claim 11, the alarm generator component is configured to receive events that are pushed from the industrial controller.

13. The system of claim 1, an industrial field device comprises the receiver component and the alarm generator component.

14. The system of claim 13, further comprising:
a synchronization component that synchronizes a clock of the field device with at least one other clock associated with a second field device; and
a timestamp generator component that utilizes the clock to create a timestamp and associates the timestamp with the configured alarm.

15. A method for configuring an alarm, comprising:
receiving parameters relating to an industrial process;
accessing alarm information based at least in part upon the received parameters;
exposing data tables during run-time;
modifying the accessed alarm information based at least in part on the received parameters; and
configuring an alarm during run-time based at least in part upon the modification of the accessed alarm information.

16. The method of claim 15, configuring the alarm during run-time comprises modifying threshold values associated with backing tags within the accessed alarm information.

17. The method of claim 15, further comprising writing logic code to alter alarm instructions during run-time.

18. The method of claim 17, the logic code is at least one of ladder logic, structured text, a function block, or a sequential function diagram.

19. A system for configuring alarms, comprising:
means for analyzing parameters relating to an industrial process;
means for accessing alarm information;
means for exposing data tables; and
means for modifying at least one of the alarm information or the data tables based at least in part upon the analysis.

* * * * *